(12) United States Patent
Rozenshtein et al.

(10) Patent No.: US 7,769,783 B2
(45) Date of Patent: Aug. 3, 2010

(54) COMPUTING ALGEBRAIC EQUATIONS

(75) Inventors: David Rozenshtein, Syosset, NY (US); Sandip Mehta, Central Islip, NY (US)

(73) Assignee: Reuters Limited, London (GB)

( * ) Notice: Subject to any disclaimer, the term of this patent is extended or adjusted under 35 U.S.C. 154(b) by 496 days.

(21) Appl. No.: 10/862,330

(22) Filed: Jun. 8, 2004

(65) Prior Publication Data

US 2005/0234965 A1 Oct. 20, 2005

Related U.S. Application Data

(60) Provisional application No. 60/563,467, filed on Apr. 20, 2004.

(51) Int. Cl.
G06F 7/00 (2006.01)
(52) U.S. Cl. ........................ 707/793; 707/953
(58) Field of Classification Search .................. 707/793
See application file for complete search history.

(56) References Cited

U.S. PATENT DOCUMENTS

| | | | | |
|---|---|---|---|---|
| 4,464,650 A | * | 8/1984 | Eastman et al. ............... 341/51 |
| 5,119,465 A | * | 6/1992 | Jack et al. ..................... 717/137 |
| 5,504,848 A | * | 4/1996 | Yamada et al. ............... 715/205 |
| 5,581,756 A | * | 12/1996 | Nakabayashi ................... 707/2 |
| 5,727,161 A | * | 3/1998 | Purcell, Jr. ...................... 705/7 |
| 5,819,257 A | * | 10/1998 | Monge et al. ................... 707/2 |
| 5,911,072 A | * | 6/1999 | Simonyi ...................... 717/105 |
| 5,933,833 A | * | 8/1999 | Musashi ...................... 707/102 |
| 6,061,690 A | * | 5/2000 | Nori et al. ............... 707/103 R |
| 6,343,376 B1 | * | 1/2002 | Saxe et al. ................... 717/154 |
| 6,424,972 B1 | * | 7/2002 | Berger et al. ................ 707/101 |
| 6,434,545 B1 | * | 8/2002 | MacLeod et al. ............... 707/3 |
| 7,107,277 B1 | * | 9/2006 | Mitra et al. .................. 707/100 |
| 2001/0007988 A1 | * | 7/2001 | Bauchot et al. ............. 707/100 |
| 2002/0178171 A1 | * | 11/2002 | Walker et al. ............... 707/102 |
| 2003/0191765 A1 | * | 10/2003 | Bargh et al. ................. 707/100 |
| 2004/0103366 A1 | * | 5/2004 | Peyton-Jones et al. ...... 715/503 |
| 2004/0193439 A1 | * | 9/2004 | Marrott ......................... 705/1 |
| 2004/0243593 A1 | * | 12/2004 | Stolte et al. ................. 707/100 |
| 2005/0050088 A1 | * | 3/2005 | Kotler et al. ................ 707/102 |

OTHER PUBLICATIONS

Wong, et al., "A New Algorithm for Floorplan Design", 1986, Proceedings of the 23rd ACM/IEEE conference on Design automation, pp. 101-107.*

(Continued)

*Primary Examiner*—John R. Cottingham
*Assistant Examiner*—Nirav K Khakhar
(74) *Attorney, Agent, or Firm*—Buckley, Maschoff & Talwalkar LLC

(57) ABSTRACT

Methods and systems for computing algebraic equations are disclosed, with particular relevance to financial analytics. Analytic formulas may be represented as data, and the analytic system may be structured as a kind of an analytic interpretation engine in a database layer of a system. Because analytic formulas may be represented as data in some table or tables, analytics can be added, deleted or modified without having to make changes to the analytic engine's source code. The analytic engine may be implemented in some relational language, such as a dialect of SQL, to manipulate and compute the analytic formulas stored in the database.

39 Claims, 11 Drawing Sheets

FORMULAS

| RESULT_ITEM | FORMULA_TYPE | INPUT_ITEM | INPUT_ROLE |
|---|---|---|---|
| 'R1' | 'ADD' | 'I1' | 'AI' |
| 'R1' | 'ADD' | 'I2' | 'AI' |
| 'R1' | 'ADD' | 'I3' | 'SI' |
| 'R2' | 'MULT' | '100.0' | 'MC' |
| 'R2' | 'MULT' | 'I4' | 'MI' |
| 'R2' | 'MULT' | 'I5' | 'DI' |

OTHER PUBLICATIONS

Mathematical Markup Language (MathML) Version 2.0 (Second Edition), 2003, W3C.*

David Rozenshtein, et al., "Tree Processing in SQL", Preview Edition, SQL Forum, Oct. 1995, pp. 1-25.

David Rozenshtein, "Tree Processing in SQL", SQL Forum, vol. 4, No. 3, 1995, pp. 17-22.

David Rozenshtein et al., "A Novel Approach to Computing Extreme Values in Transact SQL", SQL Forum, Sep./Oct. 1993, pp. 33-38 and 42.

David Rozenshtein, "Implementing Product Aggregate in SQL", SQL Forum, Mar./Apr. 1993, pp. 18, 19 and 26.

David Rozenshtein, et al., "Optimizing Transact-SQL: Advanced Programming Techniques", SQL Forum, 1995, 132 pages.

* cited by examiner

PERIODS

| ENTITY | PERIOD | START_DATE | END_DATE |
|---|---|---|---|
| 'Acme Corp.' | 'YR-2002' | '2002-01-01' | '2002-12-31' |
| 'Acme Corp.' | 'Q1-2002' | '2002-01-01' | '2002-03-31' |

Figure 1

DATA

| ENTITY | PERIOD | ITEM | VALUE |
|---|---|---|---|
| 'Acme Corp.' | 'YR-2002' | 'Total Revenue' | 5000000.00 |
| 'Acme Corp.' | 'YR-2002' | 'Operating Margin' | 0.20 |

Figure 2

FORMULAS

| RESULT_ITEM | FORMULA_TYPE | INPUT_ITEM | INPUT_ROLE |
|---|---|---|---|
| 'R1' | 'ADD' | 'I1' | 'AI' |
| 'R1' | 'ADD' | 'I2' | 'AI' |
| 'R1' | 'ADD' | 'I3' | 'SI' |
| 'R2' | 'MULT' | '100.0' | 'MC' |
| 'R2' | 'MULT' | 'I4' | 'MI' |
| 'R2' | 'MULT' | 'I5' | 'DI' |

Figure 3

FORMULAS

| RESULT_ITEM | FORMULA_TYPE | INPUT_ITEM | INPUT_ROLE |
|---|---|---|---|
| 'R4' | 'COMP' | 'I1' | 'LI' |
| 'R4' | 'COMP' | '<' | 'OP' |
| 'R4' | 'COMP' | 'I2' | 'RI' |
| 'R5' | 'COMP' | 'I1' | 'LI' |
| 'R5' | 'COMP' | '!=' | 'OP' |
| 'R5' | 'COMP' | '5' | 'RC' |

Figure 4

FORMULAS

| RESULT_ITEM | FORMULA_TYPE | INPUT_ITEM | INPUT_ROLE |
|---|---|---|---|
| 'R6' | 'LOGIC' | 'C1' | 'NOT' |
| 'R7' | 'LOGIC' | 'C1' | 'AND' |
| 'R7' | 'LOGIC' | 'C2' | 'AND' |
| 'R8' | 'LOGIC' | 'C1' | 'OR' |
| 'R8' | 'LOGIC' | 'C2' | 'OR' |
| 'R8' | 'LOGIC' | 'C3' | 'OR' |

Figure 5

| NOT | FALSE | MAYBE | TRUE |
|---|---|---|---|
|  | TRUE | MAYBE | FALSE |

Figure 6A

| AND | FALSE | MAYBE | TRUE |
|---|---|---|---|
| FALSE | FALSE | FALSE | FALSE |
| MAYBE | FALSE | MAYBE | MAYBE |
| TRUE | FALSE | MAYBE | TRUE |

Figure 6B

| OR | FALSE | MAYBE | TRUE |
|---|---|---|---|
| FALSE | FALSE | MAYBE | TRUE |
| MAYBE | MAYBE | MAYBE | TRUE |
| TRUE | TRUE | TRUE | TRUE |

Figure 6C

FORMULAS

| RESULT_ITEM | FORMULA_PREF | FORMULA_TYPE | FORMULA_CONDITION | MIN_ITEMS_REQUIRED | INPUT_ITEM | INPUT_ROLE | MANDATORY_ITEM_FLAG |
|---|---|---|---|---|---|---|---|
| 'R1' | 1 | 'ADD' | 'R10' | 2 | 'I1' | 'AI' | 1 |
| 'R1' | 1 | 'ADD' | 'R10' | 2 | 'I2' | 'AI' | 0 |
| 'R1' | 1 | 'ADD' | 'R10' | 2 | 'I3' | 'SI' | 0 |
| 'R2' | 1 | 'MULT' | NULL | 1 | '100.0' | 'MC' | NULL |
| 'R2' | 1 | 'MULT' | NULL | 1 | 'I4' | 'MI' | 0 |
| 'R2' | 1 | 'MULT' | NULL | 1 | 'I5' | 'DI' | 0 |
| 'R11' | 1 | 'ADD' | 'R12' | NULL | 'I6' | 'AI' | 1 |
| 'R11' | 1 | 'ADD' | 'R12' | NULL | 'I7' | 'AI' | 1 |
| 'R11' | 2 | 'MULT' | 'R13' | NULL | 'I6' | 'MI' | 1 |
| 'R11' | 2 | 'MULT' | 'R13' | NULL | 'I8' | 'MI' | 0 |
| 'R11' | 3 | 'ADD' | NULL | NULL | 'I9' | 'AI' | 1 |
| 'R10' | 0 | 'COMP' | NULL | NULL | 'I1' | 'LI' | NULL |
| 'R10' | 0 | 'COMP' | NULL | NULL | '!=' | 'OP' | NULL |
| 'R10' | 0 | 'COMP' | NULL | NULL | '5' | 'RC' | NULL |
| 'R12' | 0 | 'COMP' | NULL | NULL | 'I2' | 'LI' | NULL |
| 'R12' | 0 | 'COMP' | NULL | NULL | '<' | 'OP' | NULL |
| 'R12' | 0 | 'COMP' | NULL | NULL | 'I3' | 'RI' | NULL |
| 'R13' | 0 | 'LOGIC' | NULL | NULL | 'R12' | 'NOT' | NULL |

Figure 7

```
CREATE TABLE PERIODS (
    ENTITY       VARCHAR(64),
    PERIOD       VARCHAR(64),
    START_DATE   DATETIME,
    END_DATE     DATETIME,
    PRIMARY KEY(ENTITY, PERIOD))
```

Figure 8

```
CREATE TABLE DATA (
    ENTITY       VARCHAR(64),
    PERIOD       VARCHAR(64),
    ITEM         VARCHAR(64),
    VALUE        NUMERIC(38,5),
    PRIMARY KEY(ENTITY, PERIOD, ITEM))
```

Figure 9

```
CREATE TABLE FORMULAS (
    RESULT_ITEM   VARCHAR(64),
    FORMULA_TYPE  VARCHAR(64),
    INPUT_ITEM    VARCHAR(64),
    INPUT_ROLE    VARCHAR(64),
    PRIMARY KEY (RESULT_ITEM, INPUT_ITEM))
```

Figure 10

```
SELECT P.ENTITY, P.PERIOD, F.RESULT_ITEM,
    SUM(CASE
        WHEN F.INPUT_ROLE='AI' THEN D.VALUE
        WHEN F.INPUT_ROLE='AC' THEN CAST(F.INPUT_ITEM AS FLOAT)
        WHEN F.INPUT_ROLE='SI' THEN -D.VALUE
        WHEN F.INPUT_ROLE='SC' THEN -CAST(F.INPUT_ITEM AS FLOAT)
    END) AS VALUE
FROM PERIODS AS P
    CROSS JOIN FORMULAS AS F
    LEFT OUTER JOIN DATA AS D
        ON P.ENTITY=D.ENTITY AND P.PERIOD=D.PERIOD AND F.INPUT_ITEM=D.ITEM
WHERE F.FORMULA_TYPE='ADD'
GROUP BY P.ENTITY, P.PERIOD, F.RESULT_ITEM
```

Figure 11

```
SELECT P.ENTITY, P.PERIOD, F.RESULT_ITEM,
    EXP(SUM(CASE
            WHEN F.INPUT_ROLE='MI'
            THEN LOG(ABS(CASE WHEN D.VALUE!=0 THEN D.VALUE ELSE NULL END))
            WHEN F.INPUT_ROLE='MC'
            THEN LOG(ABS(CAST(F.INPUT_ITEM AS FLOAT)))
            WHEN F.INPUT_ROLE='DI'
            THEN -LOG(ABS(CASE WHEN D.VALUE!=0 THEN D.VALUE ELSE NULL END))
            WHEN F.INPUT_ROLE='DC'
            THEN -LOG(ABS(CAST(F.INPUT_ITEM AS FLOAT)))
        END))*
    (1-SUM(CASE WHEN D.VALUE<0
            OR F.INPUT_ROLE IN ('MC','DC') AND CAST(F.INPUT_ITEM AS FLOAT)<0
                THEN 1 ELSE 0
          END)%2*2) AS VALUE
FROM PERIODS AS P
    CROSS JOIN FORMULAS AS F
    LEFT OUTER JOIN DATA AS D
        ON P.ENTITY=D.ENTITY AND P.PERIOD=D.PERIOD AND F.INPUT_ITEM=D.ITEM
WHERE F.FORMULA_TYPE='MULT'
GROUP BY P.ENTITY, P.PERIOD, F.RESULT_ITEM
```

Figure 12

```
SELECT ENTITY, PERIOD, RESULT_ITEM,
    CASE
        WHEN OPERATOR='=' AND LEFT_ARGUMENT=RIGHT_ARGUMENT THEN 1
        WHEN OPERATOR='!=' AND LEFT_ARGUMENT!=RIGHT_ARGUMENT THEN 1
        WHEN OPERATOR='<' AND LEFT_ARGUMENT<RIGHT_ARGUMENT THEN 1
        WHEN OPERATOR='<=' AND LEFT_ARGUMENT<=RIGHT_ARGUMENT THEN 1
        WHEN OPERATOR='>' AND LEFT_ARGUMENT>RIGHT_ARGUMENT THEN 1
        WHEN OPERATOR='>=' AND LEFT_ARGUMENT>=RIGHT_ARGUMENT THEN 1
        WHEN LEFT_ARGUMENT IS NULL OR RIGHT_ARGUMENT IS NULL THEN 0.5
        ELSE 0
    END AS VALUE
FROM (SELECT P.ENTITY, P.PERIOD, F.RESULT_ITEM,
        MAX(CASE WHEN F.INPUT_ROLE='OP' THEN F.INPUT_ITEM END) AS OPERATOR,
        MAX(CASE
                WHEN F.INPUT_ROLE='LI' THEN D.VALUE
                WHEN F.INPUT_ROLE='LC' THEN CAST(F.INPUT_ITEM AS FLOAT)
            END) AS LEFT_ARGUMENT,
        MAX(CASE
                WHEN F.INPUT_ROLE='RI' THEN D.VALUE
                WHEN F.INPUT_ROLE='RC' THEN CAST(F.INPUT_ITEM AS FLOAT)
            END) AS RIGHT_ARGUMENT
     FROM PERIODS AS P
        CROSS JOIN FORMULAS AS F
        LEFT OUTER JOIN DATA AS D
            ON P.ENTITY=D.ENTITY AND P.PERIOD=D.PERIOD AND F.INPUT_ITEM=D.ITEM
     WHERE F.FORMULA_TYPE='COMP'
     GROUP BY P.ENTITY, P.PERIOD, F.RESULT_ITEM) AS T
```

Figure 13

```
SELECT D.ENTITY, D.PERIOD, F.RESULT_ITEM,
    CASE MIN(F.INPUT_ROLE)
        WHEN 'NOT' THEN MIN(1-D.VALUE)
        WHEN 'AND' THEN MIN(D.VALUE)
        WHEN 'OR' THEN MAX(D.VALUE)
    END AS VALUE
FROM FORMULAS AS F
    INNER JOIN DATA AS D
        ON F.INPUT_ITEM=D.ITEM
WHERE F.FORMULA_TYPE='LOGIC'
GROUP BY D.ENTITY, D.PERIOD, F.RESULT_ITEM
```

Figure 14

```
CREATE TABLE FORMULAS (
    RESULT_ITEM         VARCHAR(64),
    FORMULA_PREF        INT,
    FORMULA_TYPE        VARCHAR(64),
    FORMULA_CONDITION   VARCHAR(64),
    MIN_ITEMS_REQUIRED  INT,
    INPUT_ITEM          VARCHAR(64),
    INPUT_ROLE          VARCHAR(64),
    MANDATORY_ITEM_FLAG INT,
    PRIMARY KEY (RESULT_ITEM, FORMULA_PREF, INPUT_ITEM))
```

Figure 15

```
SELECT ENTITY, PERIOD, RESULT_ITEM AS ITEM,
   CAST(Substring(MIN(
         CAST(100+FORMULA_PREF AS CHAR(3))+Str(VALUE,38,5)
      ),4,32) AS NUMERIC(38,5)) AS VALUE
FROM (SELECT P.ENTITY, P.PERIOD, F.RESULT_ITEM, F.FORMULA_PREF,
      CASE
         WHEN MIN(F.FORMULA_TYPE)='ADD'
         THEN
            (SUM(CASE
                  WHEN F.INPUT_ROLE='AI' THEN D.VALUE
                  WHEN F.INPUT_ROLE='AC' THEN CAST(F.INPUT_ITEM AS FLOAT)
                  WHEN F.INPUT_ROLE='SI' THEN -D.VALUE
                  WHEN F.INPUT_ROLE='SC' THEN -CAST(F.INPUT_ITEM AS FLOAT)
               END))
         WHEN MIN(F.FORMULA_TYPE)='MULT'
         THEN EXP(SUM(CASE
                     WHEN F.INPUT_ROLE='MI'
                     THEN LOG(ABS(CASE WHEN D.VALUE!=0
                                       THEN D.VALUE ELSE NULL END))
                     WHEN F.INPUT_ROLE='MC'
                     THEN LOG(ABS(CAST(F.INPUT_ITEM AS FLOAT)))
                     WHEN F.INPUT_ROLE='DI'
                     THEN -LOG(ABS(CASE WHEN D.VALUE!=0
                                       THEN D.VALUE ELSE NULL END))
                     WHEN F.INPUT_ROLE='DC'
                     THEN -LOG(ABS(CAST(F.INPUT_ITEM AS FLOAT)))
                  END))
               *(1-SUM(CASE WHEN D.VALUE<0
                        OR F.INPUT_ROLE IN ('MC','DC')
                           AND CAST(F.INPUT_ITEM AS FLOAT)<0
                           THEN 1
                           ELSE 0
                     END)%2*2)
      END AS VALUE
      FROM PERIODS AS P
         CROSS JOIN FORMULAS AS F
         LEFT OUTER JOIN DATA AS D
            ON P.ENTITY=D.ENTITY AND P.PERIOD=D.PERIOD AND F.INPUT_ITEM=D.ITEM
      WHERE F.FORMULA_TYPE IN ('ADD','MULT')
      GROUP BY P.ENTITY, P.PERIOD, F.RESULT_ITEM, F.FORMULA_PREF
      HAVING MAX(CASE WHEN F.MANDATORY_ITEM_FLAG=1 AND D.VALUE IS NULL
                  THEN 1 ELSE 0
            END)=0
      AND IsNull(MIN(F.MIN_ITEMS_REQUIRED),0)<=
                  SUM(CASE WHEN D.VALUE IS NOT NULL THEN 1 ELSE 0 END)
      AND (MIN(F.FORMULA_CONDITION) IS NULL
         OR EXISTS (SELECT 1
                  FROM DATA
                  WHERE ENTITY=P.ENTITY
                  AND PERIOD=P.PERIOD
                  AND ITEM=MIN(F.FORMULA_CONDITION)
                  AND VALUE=1))
   ) AS T
WHERE VALUE IS NOT NULL
GROUP BY ENTITY, PERIOD, RESULT_ITEM
```

Figure 16

```
CREATE TABLE FORMULAS (
    COMPUTE_PASS        INT,
    RESULT_ITEM         VARCHAR(64),
    FORMULA_PREF        INT,
    FORMULA_TYPE        VARCHAR(64),
    FORMULA_CONDITION   VARCHAR(64),
    MIN_ITEMS_REQUIRED  INT,
    INPUT_ITEM          VARCHAR(64),
    INPUT_ROLE          VARCHAR(64),
    MANDATORY_ITEM_FLAG INT,
    PRIMARY KEY (RESULT_ITEM, FORMULA_PREF, INPUT_ITEM))
```

Figure 17

```
CREATE TABLE DEPENDS (
    RESULT_ITEM     VARCHAR(64),
    INPUT_ITEM      VARCHAR(64),
    PRIMARY KEY(RESULT_ITEM, INPUT_ITEM))

CREATE TABLE PASSES (
    RESULT_ITEM     VARCHAR(64),
    PASS            INT,
    PRIMARY KEY(RESULT_ITEM))
```

Figure 18

```
-- Step 1
DECLARE @P INT
SELECT @P=1

-- Step 2
INSERT INTO DEPENDS
SELECT DISTINCT RESULT_ITEM, INPUT_ITEM
FROM FORMULAS
UNION
SELECT DISTINCT RESULT_ITEM, FORMULA_CONDITION
FROM FORMULAS
WHERE FORMULA_CONDITION IS NOT NULL -- Step 3
INSERT INTO PASSES
SELECT DISTINCT RESULT_ITEM, @P
FROM DEPENDS
WHERE RESULT_ITEM NOT IN
    (SELECT D1.RESULT_ITEM
    FROM DEPENDS AS D1
        INNER JOIN DEPENDS AS D2
            ON D1.INPUT_ITEM=D2.RESULT_ITEM)

-- Step 4
WHILE (@@rowcount>0) BEGIN
    -- Step 5
    DELETE DEPENDS
    FROM DEPENDS
    WHERE RESULT_ITEM IN
        (SELECT RESULT_ITEM
        FROM PASSES
        WHERE PASS=@P)

-- Step 6
    SELECT @P=@P+1

-- Step 7
    INSERT INTO PASSES
    SELECT DISTINCT RESULT_ITEM, @P
    FROM DEPENDS
    WHERE RESULT_ITEM NOT IN
        (SELECT D1.RESULT_ITEM
        FROM DEPENDS AS D1
            INNER JOIN DEPENDS AS D2
                ON D1.INPUT_ITEM=D2.RESULT_ITEM)
END -- Step 8
UPDATE FORMULAS
SET COMPUTE_PASS=PASSES.PASS
FROM FORMULAS, PASSES
WHERE FORMULAS.RESULT_ITEM=PASSES.RESULT_ITEM
```

Figure 19

```
-- Alternative implementation of Step 3 of Figure 19.
INSERT INTO PASSES
SELECT DISTINCT RESULT_ITEM, @P
FROM DEPENDS AS D1
WHERE NOT EXISTS
    (SELECT 1
    FROM DEPENDS AS D2
    WHERE D1.RESULT_ITEM=RESULT_ITEM
    AND EXISTS
        (SELECT 1
        FROM DEPENDS
        WHERE D2.INPUT_ITEM=RESULT_ITEM)
    )
```

Figure 20

```
-- Step 1
DECLARE @P INT, @NUM_PASSES INT
SELECT @NUM_PASSES=MAX(COMPUTE_PASS) FROM FORMULAS
SELECT @P=1

-- Step 2
WHILE (@P<=@NUM_PASSES) BEGIN
    -- Step 3
    INSERT INTO DATA
```

Figure 21A

```
-- Step 4
SELECT ENTITY, PERIOD, RESULT_ITEM AS ITEM,
    CAST(Substring(MIN(
            CAST(100+FORMULA_PREF AS CHAR(3))+Str(VALUE,38,5)
    ),4,32) AS NUMERIC(38,5)) AS VALUE
FROM (SELECT P.ENTITY, P.PERIOD, F.RESULT_ITEM, F.FORMULA_PREF,
        CASE
            WHEN MIN(F.FORMULA_TYPE)='ADD'
            THEN
                (SUM(CASE
                    WHEN F.INPUT_ROLE='AI' THEN D.VALUE
                    WHEN F.INPUT_ROLE='AC' THEN CAST(F.INPUT_ITEM AS FLOAT)
                    WHEN F.INPUT_ROLE='SI' THEN -D.VALUE
                    WHEN F.INPUT_ROLE='SC' THEN -CAST(F.INPUT_ITEM AS FLOAT)
                END))
            WHEN MIN(F.FORMULA_TYPE)='MULT'
            THEN EXP(SUM(CASE
                    WHEN F.INPUT_ROLE='MI'
                    THEN LOG(ABS(CASE WHEN D.VALUE!=0 THEN
                                            D.VALUE ELSE NULL END))
                    WHEN F.INPUT_ROLE='MC'
                    THEN LOG(ABS(CAST(F.INPUT_ITEM AS FLOAT)))
                    WHEN F.INPUT_ROLE='DI'
                    THEN -LOG(ABS(CASE WHEN D.VALUE!=0 THEN
                                            D.VALUE ELSE NULL END))
                    WHEN F.INPUT_ROLE='DC'
                    THEN -LOG(ABS(CAST(F.INPUT_ITEM AS FLOAT)))
                END))
                *(1-SUM(CASE WHEN D.VALUE<0
                            OR F.INPUT_ROLE IN ('MC','DC')
                                AND CAST(F.INPUT_ITEM AS FLOAT)<0
                            THEN 1 ELSE 0
                END)%2*2)
        END AS VALUE
    FROM PERIODS AS P
        CROSS JOIN FORMULAS AS F
        LEFT OUTER JOIN DATA AS D
            ON P.ENTITY=D.ENTITY AND P.PERIOD=D.PERIOD
                            AND F.INPUT_ITEM=D.ITEM
    WHERE F.COMPUTE_PASS=@P
    AND F.FORMULA_TYPE IN ('ADD','MULT')
    GROUP BY P.ENTITY, P.PERIOD, F.RESULT_ITEM, F.FORMULA_PREF
    HAVING MAX(CASE WHEN F.MANDATORY_ITEM_FLAG=1 AND D.VALUE IS NULL
                THEN 1 ELSE 0
            END)=0
    AND IsNull(MIN(F.MIN_ITEMS_REQUIRED),0)<=
                SUM(CASE WHEN D.VALUE IS NOT NULL THEN 1 ELSE 0 END)
    AND (MIN(F.FORMULA_CONDITION) IS NULL
        OR EXISTS (SELECT 1
                FROM DATA
                WHERE ENTITY=P.ENTITY
                AND PERIOD=P.PERIOD
                AND ITEM=MIN(F.FORMULA_CONDITION)
                AND VALUE=1))
    ) AS T
WHERE VALUE IS NOT NULL
GROUP BY ENTITY, PERIOD, RESULT_ITEM
UNION ALL
```

Figure 21B

```
-- Step 5
SELECT ENTITY, PERIOD, RESULT_ITEM,
    CASE
        WHEN OPERATOR='=' AND LEFT_ARGUMENT=RIGHT_ARGUMENT THEN 1
        WHEN OPERATOR='!=' AND LEFT_ARGUMENT!=RIGHT_ARGUMENT THEN 1
        WHEN OPERATOR='<' AND LEFT_ARGUMENT<RIGHT_ARGUMENT THEN 1
        WHEN OPERATOR='<=' AND LEFT_ARGUMENT<=RIGHT_ARGUMENT THEN 1
        WHEN OPERATOR='>' AND LEFT_ARGUMENT>RIGHT_ARGUMENT THEN 1
        WHEN OPERATOR='>=' AND LEFT_ARGUMENT>=RIGHT_ARGUMENT THEN 1
        WHEN LEFT_ARGUMENT IS NULL OR RIGHT_ARGUMENT IS NULL THEN 0.5
        ELSE 0
    END AS VALUE
FROM (SELECT P.ENTITY, P.PERIOD, F.RESULT_ITEM,
        MAX(CASE WHEN F.INPUT_ROLE='OP' THEN F.INPUT_ITEM END)
                                                    AS OPERATOR,
        MAX(CASE
            WHEN F.INPUT_ROLE='LI' THEN D.VALUE
            WHEN F.INPUT_ROLE='LC' THEN CAST(F.INPUT_ITEM AS FLOAT)
        END) AS LEFT_ARGUMENT,
        MAX(CASE
                WHEN F.INPUT_ROLE='RI' THEN D.VALUE
                WHEN F.INPUT_ROLE='RC' THEN CAST(F.INPUT_ITEM AS FLOAT)
        END) AS RIGHT_ARGUMENT
    FROM PERIODS AS P
        CROSS JOIN FORMULAS AS F
        LEFT OUTER JOIN DATA AS D
            ON P.ENTITY=D.ENTITY AND P.PERIOD=D.PERIOD
                                AND F.INPUT_ITEM=D.ITEM
    WHERE F.COMPUTE_PASS=@P
    AND F.FORMULA_TYPE='COMP'
    GROUP BY P.ENTITY, P.PERIOD, F.RESULT_ITEM) AS T
UNION ALL
-- Step 6
SELECT D.ENTITY, D.PERIOD, F.RESULT_ITEM,
    CASE MIN(F.INPUT_ROLE)
        WHEN 'NOT' THEN MIN(1-D.VALUE)
        WHEN 'AND' THEN MIN(D.VALUE)
        WHEN 'OR' THEN MAX(D.VALUE)
    END AS VALUE
FROM FORMULAS AS F
    INNER JOIN DATA AS D
        ON F.INPUT_ITEM=D.ITEM
WHERE F.COMPUTE_PASS=@P
AND F.FORMULA_TYPE='LOGIC'
GROUP BY D.ENTITY, D.PERIOD, F.RESULT_ITEM -- Step 7
    SELECT @P=@P+1
END
```

Figure 21C

COMPUTING ALGEBRAIC EQUATIONS

This application claims priority to U.S. Provisional Application No. 60/563,467, filed Apr. 20, 2004, entitled Computing Algebraic Equations, herein incorporated by reference for all purposes.

FIELD OF THE INVENTION

The present invention relates to a method for computing algebraic equations, with particular emphasis on financial analytics. The present invention further relates to an analytic engine employing a method of computing algebraic equations in a relational database using a relational language such as SQL.

BACKGROUND OF THE INVENTION

A financial analytic is defined by a formula calculating some financial result for a company, instrument, index, industry, market and other like business entities. As inputs, analytic formulas generally take various financial metrics for such entities (e.g., items from financial statements, estimates, prices, interest rates and yields, etc.), values computed for other analytics, and constants. As operations, analytic formulas involve various operators.

A typical approach to building an analytic system is to hard-code the analytic formulas into the system's source code. An important and obvious disadvantage of this approach is the need to modify the system's source code as analytics are added, deleted or modified.

Thus, it would be an advancement in the art to provide an adaptive financial analytic system to compute algebraic equations that does not require modification of the systems' source code as analytics are added, deleted or modified.

BRIEF SUMMARY OF THE INVENTION

The present invention may be used to compute algebraic equations and has particular application to financial analytics. However, the provided financial analytics examples are illustrative and are not meant to limit the present invention in any way.

In the inventive system, analytic formulas are represented as data, and the analytic system is implemented as a kind of an analytic interpretation engine. This way analytics can be added, deleted or modified without having to make any changes to the analytic engine's source code.

Because the input data for the analytics is typically stored in a database, and because the results of analytic computations usually need to be stored in the database as well, it is advantageous to perform the analytic computations entirely in the database layer. To facilitate this, the analytic definitions themselves may also be kept in the database. Given the current prevalence of relational databases, the analytic definitions may be kept as data in some table or tables, and the analytic engine may be implemented in some relational language, such as a dialect of SQL.

A typical way to keep analytic definitions in a database is to represent each analytic formula as a text string stored in some table. There are two basic approaches for writing an analytic engine suitable for such representation. The first involves writing a precedence-parser-like interpreter. The second involves generating computational code fragments around the analytic formula definitions and executing them. Both approaches exhibit several important weaknesses.

In regards to the precedence-parser approach, resulting computations are usually done one analytic formula/one business entity at a time, which is quite inefficient. Also, writing the actual expression parser in SQL is at best quite complex.

In regards to the code generation approach, there are issues having to do with when the computational code is generated. If this is done in advance of the analytic computations, then there is an undesirable lag between analytic specification and execution. If this is done during the computation using dynamic SQL, then the lag is avoided but the overall efficiency suffers.

In the present approach, the set of analytic formulas is represented as a kind of analytic expression graph. The edges of that graph are then represented by rows which are stored in a table in the database. The analytic engine, in turn, is implemented as a kind of specialized graph traversal algorithm.

The inventive approach provides an elegant and efficient system, which computes many analytic formulas/all business entities at a time. The number of SQL statement executions is independent of the number of business entities involved. Instead, the number of SQL executions is proportional only to the depth of the analytic graph, which is usually the logarithm of the number of distinct financial metrics and analytic formulas.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 1 illustrates a fragment of a PERIODS table according to an illustrative embodiment of the invention.

FIG. 2 illustrates a fragment of a DATA table according to an illustrative embodiment of the invention.

FIG. 3 illustrates a fragment of a FORMULAS table storing data regarding computational formulas according to an illustrative embodiment of the invention.

FIG. 4 illustrates a fragment of a FORMULAS table storing data regarding comparative conditional formulas according to an illustrative embodiment of the invention.

FIG. 5 illustrates a fragment of a FORMULAS table storing data regarding logical conditional formulas according to an illustrative embodiment of the invention.

FIGS. 6A, 6B, and 6C illustrate the standard 3-valued logic truth tables for NOT, AND and OR, respectively.

FIG. 7 illustrates a fragment of a FORMULAS table storing data regarding enhanced formulas according to an illustrative embodiment of the invention.

FIG. 8 illustrates source code that may be used to create the PERIODS table of FIG. 1 according to an illustrative embodiment of the invention.

FIG. 9 illustrates source code that may be used to create the DATA table of FIG. 2 according to an illustrative embodiment of the invention.

FIG. 10 illustrates source code that may be used to create the FORMULAS table of FIGS. 3-5 according to an illustrative embodiment of the invention.

FIG. 11 illustrates a query suitable for computing simple additive computational formulas according to an illustrative embodiment of the invention.

FIG. 12 illustrates a query suitable for computing simple multiplicative computational formulas according to an illustrative embodiment of the invention.

FIG. 13 illustrates a query for computing comparative formulas according to an illustrative embodiment of the invention.

FIG. 14 illustrates a query for computing logical formulas according to an illustrative embodiment of the invention.

FIG. 15 illustrates source code that may be used to create the FORMULAS table of FIG. 7 according to an illustrative embodiment of the invention.

FIG. 16 illustrates a query suitable for evaluating enhanced computational formulas according to an illustrative embodiment of the invention.

FIG. 17 illustrates source code that may be used to create a FORMULAS table to facilitate ordering of computation according to an illustrative embodiment of the invention.

FIG. 18 illustrates source code that may be used to create DEPENDS and PASSES tables according to an illustrative embodiment of the invention.

FIG. 19 illustrates an algorithm that may be used to computer values for COMPUTE_PASS according to an illustrative embodiment of the invention.

FIG. 20 illustrates an alternative for step 3 of the algorithm in FIG. 19, according to an illustrative embodiment of the invention.

FIGS. 21A, 21B, and 21C collectively illustrate an SQL program implementing the analytic engine of the present invention according to an illustrative embodiment of the present invention.

DETAILED DESCRIPTION

A method for computing algebraic equations using an analytic engine according to the present invention will now be described with reference to the accompanying drawings.

1. The Nature of Data

As noted above, the input data for the analytic engine of the present invention is comprised of the various financial metrics for different business entities.

Much of this data is periodic in nature, where periods may be fiscal or calendar. As an example of data associated with fiscal periods, consider the annual and interim reports that companies file. Each such report typically includes an income statement, which in turn lists a company's revenues and expenses for that fiscal period. As an example of data associated with calendar periods, consider weekly or monthly consolidated prices. For periodic data items, a business entity usually has a value for the data item for each existing period.

Some data is non-periodic in nature, for example, where a business entity has a single value for the data item, not associated with any period in particular. Normally, this is the case with "current" or "latest" values—e.g., "yesterday's closing price," "latest shares outstanding," etc. Note that non-periodic data may be treated as a special case of periodic data, associated with a special, artificially created, single period covering the "lifespan" of the business entity.

2. The Nature of Formulas

The analytic engine of the present invention supports two types of analytic formulas: computational and conditional.

Computational formulas take numeric arguments (original financial metrics, values computed for other analytics and constants), support the 4 basic arithmetic operators: + (plus), − (minus), * (multiply), and / (divide), and return numeric results.

Conditional formulas take numeric arguments (again, original financial metrics, values computed for other analytics and constants), support the 6 basic binary comparators: =, !=, <, <=, >, and >=, support logical operators NOT, AND and OR, and return logical results.

Analytic formulas may involve results of other analytic formulas as inputs.

The analytic engine of the present invention can compute all of the analytics for all periods for all business entities.

While the current implementation of the analytic engine supports numeric arguments only, one of skill in the art will readily appreciate that it could similarly be extended to handle strings and other data types in its formulas as well.

3. Data Representation

In the specific example of financial analytics, the analytic engine assumes that the input data, and both the intermediate and final results of the computation, are all represented in tables PERIODS and DATA, whose logical structure is presented below.

```
PERIODS (
    ENTITY,
    PERIOD,
    START_DATE,
    END_DATE,
    PRIMARY KEY (ENTITY, PERIOD))
DATA (
    ENTITY,
    PERIOD,
    ITEM,
    VALUE,
    PRIMARY KEY (ENTITY, PERIOD, ITEM))
```

Table PERIODS contains information about periods of the business entities. Table DATA contains values for the various financial metrics for these periods. Illustrative SQL table creation commands for these tables are presented in FIGS. 8 and 9, respectively. The example fragments of these tables are presented in FIGS. 1 and 2, respectively.

In FIG. 1, the rows in table PERIODS exemplify two periods for Acme Corp.: the first, denoted YR-2002, representing the 2002 year, and the second, denoted Q1-2002, representing the first quarter of 2002.

In FIG. 2, the two rows in table DATA represent two financial values for Acme Corp. for period YR-2002. The first row exemplifies a typical original financial metric (e.g., taken from the income statement portion of the company's annual report), which states that Acme Corp. had total revenues of $5,000,000.00 for the 2002 year. The second row represents a typical computed analytic, which states that for the same 2002 year Acme Corp. had an operating margin of 0.20, i.e., 20%.

Each item, whether the original financial metric or a computed value, is associated with a single period for a single business entity.

Note that the present form of tables PERIODS and DATA is chosen for simplicity of presentation. The data in these tables may alternatively be spread over more tables. For example, entities can be represented in their own table, with column ENTITY in tables PERIOD and DATA being a foreign key to the entity table. Additional columns describing the nature of the values—e.g., whether the value represents an amount, count or percent, and in the case of amount what currency it is in may also be present.

4. Formula Representation

Representation of the analytic formulas may vary from a simple representation suitable for simple formulas to an enhanced representation as the complexity of formulas grows.

Conceptually, the set of all formulas can be viewed as a directed acyclic graph. In this graph, items (both results and inputs), constants and sometimes operators are represented by nodes, and the relationships between them are represented by edges. The edges of the graph are labeled; these labels represent the nature of these relationships.

For example, consider the two formulas below.

$$R1=I1+I2-I3$$

$$R4=I1<I2$$

These two formulas would be represented by a portion of the formula graph involving six nodes: five nodes for the five items involved (I1, I2, I3, R1 and R4) and one node for the operator less-than '<'. These nodes would then be connected by six edges. Three of the edges would represent the first formula: an edge from R1 to I1 labeled "add," an edge from R1 to I2 labeled "add," and an edge from R1 to I3 labeled "subtract." Three of the edges would represent the second formula: an edge from R4 to I1 labeled "left operand," an edge from R4 to I2 labeled "right operand," and an edge from R4 to the node representing operator '<' labeled "operator."

In the database, all of the formulas comprising the formula graph are represented in table FORMULAS, of which an illustrative logical structure suitable for simple formulas is presented below.

```
FORMULA (
    RESULT_ITEM,
    FORMULA_TYPE,
    INPUT_ITEM,
    INPUT_ROLE,
    PRIMARY KEY (RESULT_ITEM, INPUT_ITEM))
```

An illustrative SQL table creation command for this table is presented in FIG. 10.

4.1 Simple Computational Formulas

Two examples of simple computational formulas are shown below.

$$R1=I1+I2-I3$$

$$R2=100.0*I4/I5$$

The fragment of table FORMULAS representing these formulas is shown in FIG. 3. The first three rows in this table define R1 (the RESULT_ITEM) as an additive computational formula (FORMULA_TYPE='ADD') that uses items I1, I2 and I3 (each appearing as INPUT_ITEM). Items I1 and I2 are defined as being added in computing the result (INPUT_ROLE='AI', where 'A' denotes addition and 'I' indicates that I1 and I2 should be treated as data items). Item I3 is defined as being subtracted in computing the result (INPUT_ROLE='SI', where 'S' denotes subtraction and 'I' again indicates that I3 should be treated as a data item).

The second three rows in this table define R2 (the RESULT_ITEM) as a multiplicative computational formula (FORMULA_TYPE='MULT') that uses a constant 100.0 and items I4 and I5 (again, each appearing as INPUT_ITEM). Constant 100.0 is defined as being multiplied by in computing the result (INPUT_ROLE='MC', where 'M' denotes multiplication and 'C' indicates that symbol '100.0' should be treated as a constant). Item I4 is defined as also being multiplied by in computing the result (INPUT_ROLE='MI', where 'M' indicates multiplication and 'I' indicates that I4 should be treated as a data item). Item I5 is defined as being divided by in computing the result (INPUT_ROLE='DI', where 'D' indicates division and 'I' again indicates that I5 should be treated as a data item). In other words, viewing R2 as a fraction, constant 100.0 and item I4 are put in the numerator, and item I5 is put in the denominator.

Note that because all values in a column of a table must be the same data type, and because column INPUT_ITEM normally contains input data items' mnemonic identifiers, which are strings—e.g., 'I1', 'I2', etc., numeric constants are stored in their equivalent string form, e.g., '100.0'. These constant strings may be converted to their numeric equivalents by the code of the analytic engine.

Also note that in this representation, a computational formula cannot be both additive and multiplicative; it is one or the other. A question that arises then is how to represent formulas that involve both additive (+, −) and multiplicative (*, /) operators.

One answer is to break the formula into several formulas, connected to each other by new items representing intermediate results. For example, the formula R3=I1+I2*(I6−I7) can be equivalently rewritten as three formulas: X1=I6−I7, X2=I2*X1 and R3=I1+X2, each of which can be represented in the manner described above.

4.2 Conditional Formulas

Conditional formulas come in two flavors: comparative and logical. Each comparative formula implements a single binary comparison. Two examples of comparative formulas are shown below.

$$R4=I1<I2$$

$$R5=I1!=5$$

Their representation in table FORMULAS is shown in FIG. 4. The first three rows in this table define R4 (the RESULT_ITEM) as a comparative formula (FORMULA_TYPE='COMP') which involves three components: symbol '<' and items I1 and I2 (each of the three appearing as INPUT_ITEM). Symbol '<' denotes the less-than operator<(INPUT_ROLE='OP', where 'OP' stands for "operator"). Item I1 is defined as the left operand (INPUT_ROLE='LI', where 'L' denotes the left position and 'I' indicates that I1 should be treated as a data item). Item I2 is defined as the right operand (INPUT_ROLE='RI', where 'R' denotes the right position and 'I' again indicates that I2 should be treated as a data item). Note that in this representation, operator '<' is viewed as an input item to the formula, with its input role 'OP' designating it as a comparison operator.

The second three rows in FIG. 4 define R5 also as a comparative formula, which uses the not-equal operator !=, and where the left operand is item I1, and the right operand is constant 5 (INPUT_ROLE='RC', where 'R' indicates the right position and 'C' indicates that symbol '5' should be treated as a constant).

In addition to operators < and != shown above, the analytic engine may also support the other 4 comparison operators: = (equal), <= (less-than-or-equal), > (greater-than), and >= (greater-than-or-equal).

Logical formulas implement standard logical operators NOT, AND and OR. Examples of these formulas are shown below.

$$R6=NOT\ C1$$

$$R7=C1\ AND\ C2$$

$$R8=C1\ OR\ C2\ OR\ C3$$

Their representation in table FORMULAS is shown in FIG. 5. Here, FORMULA_TYPE='LOGIC' indicates that the formulas for R6, R7 and R8 are all logical formulas, with the INPUT_ROLE indicating the actual formula type. Note that formulas involving negation must involve exactly one input, while formulas involving AND and OR may involve any number of inputs. In other words, this representation does not limit us to conventional two-argument versions of AND and OR. For example, formula for R8 involves 3 inputs.

In this representation, a given logical formula involves one logical operator. To handle logical formulas that involve multiple operators, we again break the formula into several formulas, connected to each other by new items representing intermediate results. For example, the formula R9=C1 AND NOT (C2 OR C3) can be equivalently rewritten as three formulas: Y1=C2 OR C3, Y2=NOT Y1 and R9=C1 AND Y2, each of which can be represented in the manner described above.

Note that, by their nature, when actually computed all conditional formulas (both comparative and logical) return logical results—i.e., FALSE, TRUE or MAYBE. The third logical value MAYBE is introduced as part of standard 3-valued logic to handle uncertain outcomes which arise from the absence of values. However, because the current implementation of the analytic engine supports numeric values only, for the purposes of computation we encode both logical inputs to conditional formulas and the results of conditional formulas numerically; specifically FALSE is represented as 0, TRUE is represented as 1, and MAYBE is represented as 0.5.

5. Elements of the Analytic Engine

Various elements of the analytic engine are suitable for computing the kinds of analytic formulas described above over the data. These elements are presented as fragments of SQL code, which assume that the input data for the formulas and the formulas themselves are contained in tables PERIODS, DATA and FORMULAS as described in FIGS. 8, 9 and 10, respectively.

5.1 Computing Simple Computational Formulas

An illustrative query suitable for computing simple additive computational formulas is presented in FIG. 11. An illustrative query suitable for computing simple multiplicative computational formulas is presented in FIG. 12. Note that each of these queries computes all computational formulas (of a given formula type) over all periods for all entities at the same time.

For specificity, all fragments of SQL code are presented in the syntax of the TRANSACT SQL dialect of MICROSOFT SQL SERVER. They may be adapted to the SQL dialect of any other relational database system, including ORACLE, SYBASE, UDB/DB2, INFORMIX, KDB, and others.

To understand how the query of FIG. 11 operates, consider its conceptual trace. (This trace, as well as all other SQL query traces presented here, is conceptual in that it is meant to explain the meaning of this query and illustrate in intuitive form its operation. The actual query execution sequence is determined by the query optimizer and may well be different than what is described here. However, the conceptual trace is constructed in such as way as to guarantee sameness of the answer with an actual execution sequence.)

The trace starts with the FROM clause, which begins by taking a cross-product (CROSS JOIN) of tables PERIODS and FORMULAS, thus in effect setting up all of the formulas as possible computations for each entity/period combination. The result of this cross-product is then joined with table DATA on columns ENTITY, PERIOD and INPUT_ITEM in an attempt to obtain the input values for the formulas. Because of the left outer join, however, those rows from the cross-product that do not join to anything in DATA are not dropped, but instead are kept and extended with NULL values in place of the "real" values from DATA. (The left outer join is used here to preserve rows in FORMULA that contain constants.)

The WHERE clause then restricts the result of the FROM clause to additive formulas only.

The GROUP BY clause is executed next and groups the rows by columns ENTITY, PERIOD and RESULT_ITEM, in effect setting up a separate group for each additive formula for each entity/period combination.

The result of the formula is then computed by function SUM( ) in the SELECT clause. This function is executed once per group. To understand how it operates, consider some such group—i.e., some formula/entity/period combination. Given each row from the group, the CASE constructor inside the SUM( ) determines the nature of the input item by testing its INPUT_ROLE and returning an appropriate value. If INPUT_ROLE is 'AI' (or 'SI') denoting an additive (or subtractive) data item, then the CASE constructor returns the value (or the negated value) of that item from table DATA. If it is 'AC' (or 'SC') denoting an additive (or subtractive) constant, then the CASE constructor returns the numeric value of the constant from table FORMULAS. These returned values are then summed up by function SUM( ) as the resulting value for the formula.

The SELECT clause then retrieves a single row for each group. This row contains the ENTITY, PERIOD, RESULT_ITEM and the value returned by SUM( ) for the group. This returned value is the result of the formula evaluation for that entity/period combination.

Note that it is possible that a row marked with 'AI' or 'SI' would not succeed in joining to a corresponding row in DATA. This happens if the item represented by that row does not have a value for that entity/period combination. Because of the outer join, however, this row is not dropped. Instead, the value for D.VALUE (or the negated D.VALUE) in the CASE constructor for that row is NULL, which is then ignored by function SUM( ), in effect making the item optional. (Explicit treatment of optional and mandatory items is presented below.)

If all of the items in a formula, however, are missing values for the entity/period combination, then after the outer join all of them will have values of NULL. In a formula not involving any constants, all of the arguments to function SUM( ) will then be NULL, causing function SUM( ) itself to evaluate to NULL. This will be discussed below, showing how such NULL can be suppressed from being retrieved into the final query answer.

The query of FIG. 12 operates in basically the same way as the query of FIG. 11, except for two differences. First, the WHERE clause of the query in FIG. 12 restricts the computation to multiplicative formulas only. Second, instead of computing result as a sum of its constituent inputs, this query computes it as a product of its constituent items (or their inverses, as appropriate).

Because SQL does not provide PRODUCT( ) as a built-in aggregate function, the query implements it as an exponent of the sum of logarithms of its component values. The detailed description of how such an implementation works, including the detailed treatment of zeros, negative numbers and NULL values, is known in the art, e.g., as presented in D. Rozenshtein, "Implementing Product Aggregate in SQL," in *SQL Forum Journal*, 2(2), March/April 1993, herein incorporated by reference. The query of FIG. 12 assumes that multiplicative formulas do not involve the constant 0, either in the numerator because it would render the formula useless, or in the denominator because it would be arithmetically meaningless.

5.2 Computing Conditional Formulas

An illustrative query for computing comparative formulas is presented in FIG. 13. An illustrative query for computing logical formulas is presented in FIG. 14. Each of these queries computes all conditional formulas (of a given formula type) over all periods for all entities at the same time.

The query of FIG. 13 begins in the same basic way as the queries of FIGS. 11 and 12: its inner FROM clause sets-up all formula/entity/period combinations; its inner WHERE clause restricts the computation to comparative formulas only; and its inner GROUP BY clause groups the rows by columns ENTITY, PERIOD and RESULT_ITEM.

The inner SELECT clause in this query is somewhat different, however. To see how it operates, consider a group of rows for some particular ENTITY, PERIOD, RESULT_ITEM combination—i.e., the group of rows corresponding to a single comparative formula for a single entity/period combination. By logic, this group should consist of three rows—one denoting the operator of the comparison, and the other two denoting its left and right arguments.

Consider now the first function MAX( ) in the inner SELECT clause. Its CASE constructor determines the nature of each of these three rows by testing its INPUT_ROLE. For the row whose INPUT_ROLE is 'OP', it returns the operator symbol as the result; for the other two rows, it returns NULL values. Presented with one such symbol and two NULL values, function MAX( ) then returns the symbol as its result, which is then named OPERATOR for the use in the outer query. (For background material on using an SQL aggregate function to implement such "cherry-picking" see D. Rozenshtein, A. Abramovich, E. Birger, *Optimizing TRANSACT SQL Advanced Programming Techniques*, SQL Forum Press, 1995, herein incorporated by reference.)

The second function MAX( ) computes the left argument of the comparison in a similar manner. Here, the CASE constructor tests for one of two conditions: if INPUT_ROLE is 'LI' (left item), then the value from DATA is returned; if it is 'LC' (left constant), then the numeric value of the constant from table FORMULAS is returned. The third function MAX( ) operates in a similar fashion returning the right argument of the comparison. The results of the second and third MAX( ) are called LEFT_ARGUMENT and RIGHT_ARGUMENT, respectively, for the use in the outer query.

The CASE constructor in the outer SELECT clause then implements the actual computation of the comparison: if OPERATOR is '=', then it tests for equality between LEFT_ARGUMENT and RIGHT_ARGUMENT; if OPERATOR is '!=', then it tests for inequality, etc. As long as both LEFT_ARGUMENT and RIGHT_ARGUMENT have values, the CASE constructor returns 1 if the condition evaluates to TRUE, and 0 otherwise—i.e., for FALSE.

Again it is possible that some row marked with INPUT_ROLE of 'LI' or 'RI' will not succeed in joining to anything in DATA. Because of the outer join, this row is not dropped but instead is extended with NULL values for the columns from DATA. If this happens with the row with INPUT_ROLE of 'LI', then the corresponding (second) MAX( ) is presented with all NULL values, and itself evaluates to NULL, in turn causing LEFT_ARGUMENT to become NULL. (Similarly for the third MAX( ) and RIGHT_ARGUMENT.)

If this happens, then the CASE constructor in the outer SELECT returns 0.5 as the result of the comparative evaluation, corresponding to the logical value MAYBE consistent with the standard SQL treatment of uncertain outcomes in the 3-valued logic it uses.

The query of FIG. 14 is simpler than the queries of FIGS. 11, 12 and 13 in that it does not involve table PERIODS and does not involve an outer join. This is because logical formulas involve only data items as inputs and do not involve any constants.

Other than this, the evaluation proceeds in the standard way with the FROM clause first extending each formula from FORMULAS with values from DATA, and the WHERE clause then restricting the query to logical formulas only. The GROUP BY clause then groups the rows by columns ENTITY, PERIOD and RESULT_ITEM, again creating a separate group for each logical formula for each entity/period combination.

The actual computation of the logical result is then handled by the CASE constructor in the SELECT clause. To understand how it works, one need only understand how logic can be expressed in arithmetic. The standard 3-valued logic truth tables for NOT, AND and OR are presented in FIGS. 6A, 6B, and 6C, respectively.

A simple inspection demonstrates that if FALSE is represented by 0, TRUE is represented by 1, and MAYBE is represented by 0.5, then negation NOT P can be implemented as 1-P, conjunction P AND Q can be implemented by min(P, Q) and disjunction P OR Q can be implemented by max(P, Q).

This is what the CASE constructor in the SELECT clause does. The query in FIG. 14 can handle multi-way AND and OR, instead of just the binary ones conventionally considered and illustrated in the truth tables of FIGS. 6A, 6B, and 6C.

Note that the CASE constructor uses MIN(F.INPUT_ROLE) in its condition. This is because F.INPUT_ROLE is not one of the columns in the GROUP BY clause, and SQL requires the use of some aggregate function around it. Since all rows for the same logical formula share the same value for its INPUT_ROLE, function MIN(F.INPUT_ROLE) is presented with a list of identical values and simply returns one of them. Another aggregate function, e.g., MAX( ), could have been used here as well. Also, note that in case of F.INPUT_ROLE being NOT, even though expression MIN(1-D.VALUE) is expected to be evaluated over only a single row, and thus a single value of D.VALUE, the use of function MIN( ) is again required by SQL.

5.3 Making the Formulas More Complex

There are several optional enhancements to the formulas supported by the analytic engine of the present invention, and requisite modifications to the structure of the table containing them. The first enhancement deals with missing input values in computational formulas. The second enhancement enables making evaluation of computational formulas conditional on the satisfaction of some conditional formula. The third enhancement allows for multiple alternative definitions of the same result item, and for establishment of the preference order among the formulas defining it.

5.3.1 Handling Missing Values

The analytic engine of the present invention supports two mechanisms for handling missing input values in computational formulas: specifying whether an input item to the formula is mandatory or optional, and specifying the minimum number of input items that must have values for the formula to be computed.

Each input item in a computational formula may be specified as mandatory or optional. If an item is mandatory, then the absence of the value for it during the computation renders the formula result N/A (represented by NULL in SQL). If the item is optional, then in its absence the formula is computed as if the item is not present in its definition. Note that for additive formulas, this means that absent optional items are treated as if they had the value of 0; for multiplicative formulas, this means that absent optional items are treated as if they had the value of 1.

As an example, consider again the formula $R1=I1+I2-I3$. We may specify that items I1 and I3 are mandatory, while item I2 is optional. As a matter of notational convention, we indicate that the item is optional by following it with the notation O in parenthesis. The absence of this notation indicates that the item is mandatory. Using this convention, this version of the formula for R1 is stated as follows.

$$R1=I1+I2(O)-I3$$

Sometimes, however, the determinative factor is not whether some specific item or items have values, but rather that some minimum number of the items have values. For example, while all inputs to R1 may be optional, there must be at least two of them (it does not matter which two) present for the result to be computed.

As a matter of notational convention, this is indicated by showing the minimum number of required input items in parenthesis after the result item. The absence of this notation is interpreted as the absence of this requirement. Using this convention, this version of the formula for R1 is stated as follows.

$$R1(2)=I1(O)+I2(O)-I3(O)$$

It is often useful to combine these specifications in the same formula. For example, the version of the formula for R1 shown below states that to compute the result item R1 we must have the value of the input item I1 and a value for at least one other input item: I2 or I3.

$$R1(2)=I1+I2(O)-I3(O)$$

Note that it is typically not meaningful to specify constants as optional—constants are always there and always have values. Thus, it is not necessary to provide mandatory/optional specification for constants, and they are not counted in the minimum number of required items.

As an example, consider again the formula $R2=100.0*I4/I5$. To specify that both items I4 and I5 are optional but at least one of them is required to be present, the formula may be restated as follows.

$$R2(1)=100.0*I4(O)/I5(O)$$

The specification of whether the input item is mandatory or optional may be supported through the use of MANDATORY_ITEM_FLAG. The specification of the minimum number of input items that must have values may be supported through the use of MIN_ITEMS_REQUIRED. Both are described below.

5.3.2 Conditional Formula Evaluation

The analytic engine of the present invention supports conditioning the use of a computational formula on the satisfaction of some conditional formula. For example, consider again the formula $R1(2)=I1+I2(O)-I3(O)$. This analytic engine might only compute R1 if the conditional result R10 (defined by some logical or comparative formula) is evaluated to TRUE. Otherwise, R1 should be treated as N/A.

As a matter of notational convention, that a formula has such a condition is shown by the condition in parenthesis in front of the result item, as follows.

$$(R10)R1=I1+I2(O)-I3(O)$$

This feature may be supported through the use of FORMULA_CONDITION, described below.

5.3.3 Preference Order among Alternative Definitions for a Result Item

The analytic engine may also support the establishment of a preference order among alternative formula definitions of the same result item. For example, we may want to define some result item R11 as follows.

1. Most preferably, compute R11 as the sum of mandatory items I6 and I7, but only if condition R12 (i.e., conditional item R12 defined by some logical or comparative formula) is satisfied.
2. If that is not possible—i.e., if one or both of the items I6 and I7 are missing values, or if R12 does not evaluate to TRUE, then as a second preference compute R11 as the product of I6 and I8, where I6 is mandatory and I8 is optional, but only if condition R13 is satisfied.
3. Finally, as the last resort, compute R11 as the value of I9.

The definition of such item R11 is presented below, where, as a matter of notational convention, the formula preference order is indicated by an integer shown in square brackets at the formula start. (Lower numbers indicate higher preference; also, for result items defined by only a single formula, the preference designation is assumed to be 1, and may be omitted.)

$$(R12)R11=I6+I7 \qquad [1]$$

$$(R13)R11=I6*I8(O) \qquad [2]$$

$$R11=I9 \qquad [3]$$

Formula definition preferences may be supported through the use of FORMULA_PREF, described below.

5.4 Enhancements to Table FORMULAS

To support the three types of enhancements for analytic formulas described above, the structure of table FORMULA is extended with several additional columns, and its logical structure may become as follows.

```
FORMULAS (
    RESULT_ITEM,
    FORMULA_PREF,
    FORMULA_TYPE,
    FORMULA_CONDITION,
    MIN_ITEMS_REQUIRED,
    INPUT_ITEM,
    INPUT_ROLE
    MANDATORY_ITEM_FLAG,
    PRIMARY KEY (RESULT_ITEM, FORMULA_PREF,
        INPUT_ITEM))
```

An illustrative SQL table creation command for this table is presented in FIG. 15. The new columns in this table may be used as follows. Column MANDATORY_ITEM_FLAG may be used to indicate whether the input item is mandatory or optional; in the former case, MANDATORY_ITEM_FLAG is set to 1; in the latter case, it is set to 0. It is set to NULL for constants.

Column MIN_ITEMS_REQUIRED is set to the same value for all rows in table FORMULAS that correspond to a particular alternative definition of a formula, and contains a positive integer 1 and above indicating the minimum number of input items that must have values for the particular definition of the formula to be used to compute the result. If this requirement is absent, then this column is set to NULL.

Column FORMULA_CONDITION is set to the same value for all rows in table FORMULAS that correspond to a particular alternative definition of a formula, and contains the identity of the conditional item whose satisfaction is required for the use of that particular formula definition. If a particular formula definition does not depend on any such conditional item, then this columns is set to NULL.

Finally, column FORMULA_PREF is also set to the same value for all rows in table FORMULAS that correspond to a particular alternative definition of a formula, and contains a positive integer 1 and above indicating the preference order among the alternative formula definitions for the same result item.

Columns MANDATORY_ITEM_FLAG, MIN_ITEMS_REQUIRED and FORMULA_CONDITION are not used for conditional formulas and are instead set to NULL. Column FORMULA_PREF is also not used for conditional formulas. However, since column FORMULA_PREF is part of the primary key for table FORMULAS, it cannot be set to NULL, and may instead be set to 0 for conditional formulas—a kind of "application-level N/A."

As an example, consider the following set of formulas mostly collected from the various examples above.

$(R10) R1(2) = I1 + I2(O) - I3(O)$ $R2(1) = 100.0 * I4(O)/I5(O)$ $(R12) R11 = I6 + I7$ [1]

$(R13) R11 = I6 * I8(O)$ [2]

$R11 = I9$ [3]

$R10 = I1 != 5$ $R12 = I2 < I3$ $R13 = \text{NOT } R12$

The representation of these example formulas in table FORMULAS according to an illustrative embodiment is presented in FIG. 7.

5.5 Further Enhancements to the Analytic Engine

An illustrative revised query suitable for evaluating the enhanced computational formulas is presented in FIG. 16. The query in FIG. 16 combines in it aspects of queries from FIGS. 11 and 12, and can handle both additive and multiplicative formulas. To see how it operates, consider again its conceptual trace.

The inner FROM clause begins by taking the cross-product of tables PERIODS and FORMULAS followed by a left outer join with table DATA, thus setting up each formula for each entity/period combination. The WHERE clause then restricts the evaluation to computational (i.e., additive and multiplicative) formulas only.

The GROUP BY clause then groups the rows by columns ENTITY, PERIOD, RESULT_ITEM and FORMULA_PREF. The difference between this query and the queries of FIGS. 11 and 12 is the inclusion of column FORMULA_PREF in the GROUP BY clause, which causes a separate group to be created for each alternative definition of the resulting item.

The HAVING clause then tests each group for several conditions. First, consider the condition shown below. (The conditions are presented in the order they appear in the HAVING clause.)

```
MAX(CASE WHEN F.MANDATORY_ITEM_FLAG=1 AND
  D.VALUE IS NULL
    THEN 1 ELSE 0
    END)=0
```

This condition checks whether all of the mandatory input items actually have values. Specifically, given a row, the CASE constructor returns 1 for every row that has a missing mandatory item, and returns 0 otherwise—i.e., if the item is not mandatory or if it has a value. Function MAX( ) then returns 1 if there is at least one mandatory item with a missing value, and returns 0 if there are none—i.e., all mandatory items indeed have values. The condition then checks that the result of MAX( ) is equal to 0—i.e., all mandatory items have values.

Second, consider the condition shown below.

```
IsNull(MIN(F.MIN_ITEMS_REQUIRED),0)<=
  SUM(CASE WHEN D.VALUE IS NOT NULL THEN 1 ELSE
    0 END)
```

This condition checks that the group satisfies the requirement regarding the minimum number of items with values. Specifically: the CASE constructor returns 1 for a row with a value, and 0 otherwise; function SUM( ) then in effect counts how many rows in the group have values; finally, the less-than-or-equal operator<=checks that that number is not less that the required minimum.

(Function IsNull( ) is a built-in function in TRANSACT SQL that returns its first parameter if it is not NULL, and returns its second parameter otherwise. Since a formula not having this minimum count requirement specified would have its MIN_ITEMS_REQUIRED set to NULL, the use of this function allows us to treat such a case as a minimum count of 0. Function MIN( ) inside IsNull( ) is used because SQL requires F.MIN_ITEMS_REQUIRED to be covered by an aggregate because it is not included in the GROUP BY clause.)

Unless both of these two conditions above evaluate to TRUE, the group is dropped from the answer to the query. Together, these two conditions then implement the first enhancement to the computational formulas regarding handling missing input values.

Next, consider the condition shown below.

```
(MIN(F.FORMULA_CONDITION) IS NULL
  OR EXISTS (SELECT 1
    FROM DATA
    WHERE ENTITY=P.ENTITY
    AND PERIOD=P.PERIOD
    AND ITEM=MIN(F.FORMULA_CONDITION)
    AND VALUE=1))
```

This condition returns TRUE in one of two cases: either the formula does not have a condition FORMULA_CONDITION on its use, or it does have it and the condition is satisfied. The former case is handled by MIN(F.FORMULA_CONDITION) IS NULL, where MIN( ) is again used because SQL requires F.FORMULA_CONDITION (not being part of the GROUP BY clause) to be covered by an aggregate. The latter case is handled by the EXISTS( ) component, which requires the presence of a conditional item corresponding to condition FORMULA_CONDITION in table DATA for this entity/period combination with the value of 1 (i.e., TRUE).

Unless this condition evaluates to TRUE, the group is dropped from the answer to the query. This condition then implements the second enhancement to the computational formulas—making their use dependent on a result of some conditional formula.

The third enhancement regarding the preference order among alternative formula definition of the same result item is implemented in the outer SELECT clause considered later.

We now consider the inner SELECT clause. The main difference between it and the SELECT clauses of queries in FIGS. 11 and 12 is that this SELECT clause uses the CASE constructor to combine the computation of additive and multiplicative formulas in a single expression differentiating between them based on the FORMULA_TYPE.

The inner query then returns one row per group. This row contains the group's ENTITY, PERIOD, RESULT_ITEM, FORMULA_PREF and the resulting value for the formula.

The main query then uses the result of the inner query as its basis. First, it removes those rows where VALUE is NULL. Then, it regroups the rows by columns ENTITY, PERIOD and RESULT_ITEM, in effect putting all of the formulas defining the same result item into the same group. The outer SELECT clause then chooses the one with the lowest preference number as the final computed result.

One way the outer SELECT clause can accomplish this is via the CAST expression presented below.

```
CAST(Substring(MIN(
    CAST(100+FORMULA_PREF AS CHAR(3))+Str(VALUE,38,5)
),4,38) AS NUMERIC(38,5))
```

The technique underlying this expression was first described in D. Rozenshtein, A. Abramovich, E. Birger, "A Novel Approach to Computing Extreme Values in TRANSACT SQL," in *SQL Forum Journal*, (2)5, September/October 1993, herein incorporated by reference. To understand how this expression operates, consider a set of rows all belonging to the same group—i.e., all sharing the same ENTITY, PERIOD and RESULT_ITEM, but each having a different value for FORMULA_PREF.

Expression CAST(100+FORMULA_PREF AS CHAR (3)) takes the formula preference from each row, adds 100 to it and converts the result of the addition to its string representation. This string representation is exactly 3 characters long. Expression Str(VALUE,38,5) then uses a built-in TRANSACT SQL function Str( ) to convert each row's numeric value to its string representation. This representation is exactly 38 characters long. (Format 38,5 corresponds to the data type of VALUE as shown in FIG. 9: NUMERIC(38,5).)

The string representation of the numeric value is then concatenated to the right side of the string representation of preference, resulting in a string that is 41 characters long. For example, a row with FORMULA_PREF of 1 and VALUE of 123.45 would result in the following concatenated string. (There are 29 spaces between 101 and 123.45000.)

'101                             123.45000'

Given a set of such strings—one for each row in the group, function MIN( ) then chooses the lexicographically (i.e., alphabetically) smallest of these strings. This lexicographically smallest string is, of course, the one with the numerically lowest preference. Note that this chosen string also contains in it the string representation of the numeric value corresponding to this lowest preference.

The built-in TRANSACT SQL function Substring( ) then extracts that portion of the concatenated string that contains the numeric value. (Arguments 4,38 tell function Substring( ) to extract a substring of length 38 starting at position 4.) Finally, the outer CAST( ) converts the extracted string representation of the value into its numeric form.

(This particular formulation of the query assumes that the maximum number of alternative formula definitions for a result item is limited to 899, and thus formula preferences range from 1 to 899—more than enough in practice. If more alternative formulations are desired, then constant 100 has to be increased accordingly. For example, by increasing this constant to 1000 the analytic engine can handle up to 8999 preferences. In that case, the second Substring( ) parameter is also changed from 4 to 5.)

The outer SELECT then retrieves one row for each ENTITY, PERIOD, RESULT_ITEM combination containing the result value computed by the formula with the highest (numerically smallest) formula preference among the alternative definitions of the result item, thus implementing the third enhancement to the computational formulas.

6. The Order of Formula Evaluation

While the analytic engine of the present invention is designed to compute many formulas at the same time, it only makes sense to do so if the formulas do not depend on each other. If the result of some formula is used as an input or as a condition to some other formula, however, then clearly the formulas cannot be computed simultaneously.

For example, given the set of formulas $X1=I6-I7$, $X2=I2*X1$ and $R3=I1+X2$, we clearly need to order the computation so that $X1$ is computed before $X2$, which is in turn computed before $R3$. Another example of the need to order the computation is presented by the formula $(R10)R1(2)=I1+I2(O)-I3(O)$, where item $R10$ is defined by some conditional formula, which must be computed before $R1$.

To facilitate the ordering of the computation, another column, COMPUTE_PASS may be added to the table FORMULA. This column contains a positive integer 1 and above specifying the number of the computational pass during which each given formula would be computed. The final logical structure of table FORMULAS, according to an illustrative embodiment, thus becomes as follows.

```
FORMULAS (
    COMPUTE_PASS,
    RESULT_ITEM,
    FORMULA_PREF,
    FORMULA_TYPE,
    FORMULA_CONDITION,
    MIN_ITEMS_REQUIRED,
    INPUT_ITEM,
    INPUT_ROLE
    MANDATORY_ITEM_FLAG,
    PRIMARY KEY (RESULT_ITEM, FORMULA_PREF,
    INPUT_ITEM))
```

An illustrative SQL table creation command for this table is presented in FIG. 17. Table FORMULAS is denormalized to simplify the presentation of the approach and of the analytic engine's code. To normalize, the analytic engine may easily replace this single table with two tables FORMULA_RESULT and FORMULA_INPUT whose logical structures may be defined as follows.

```
FORMULA_RESULT (
    COMPUTE_PASS,
    RESULT_ITEM,
    FORMULA_PREF,
    FORMULA_TYPE,
    FORMULA_CONDITION,
    MIN_ITEMS_REQUIRED,
    PRIMARY KEY (RESULT_ITEM, FORMULA_PREF))
FORMULA_INPUT (
    RESULT_ITEM,
    FORMULA_PREF,
    INPUT_ITEM,
    INPUT_ROLE,
    MANDATORY_ITEM_FLAG,
    PRIMARY KEY (RESULT_ITEM, FORMULA_PREF,
        INPUT_ITEM))
```

The values for COMPUTE_PASS for the formulas may be established manually by the administrator, or be computed by an algorithm. An SQL implementation of one such algorithm in presented in FIG. 19. This implementation is broadly based on the work presented in D. Rozenshtein, "Tree Processing in SQL," in *SQL Forum Journal*, (4)3, Summer 1995, herein incorporated by reference. The algorithm in FIG. 19 uses supporting tables DEPENDS and PASSES, which may be created by SQL commands presented in FIG. 18.

The program of FIG. 19 begins in Step 1 by declaring variable @P and assigning it value 1. (By syntax, all application variables in TRANSACT SQL begin with the symbol @.)

The query of Step 2 then populates table DEPENDS from table FORMULAS. The intent of table DEPENDS is to record all of the dependencies between the various items, which then determines the order of evaluation. Specifically, a row with the RESULT_ITEM='R1' and the INPUT_ITEM='I1' in this table means that the computation of R1 depends on already having a value for I1, and therefore I1 must be computed before R1.

Note that for computational formulas result items depend not only on their respective input items but also on their formula conditions (if any). That means that, given our examples, table DEPENDS should also contain the row with the RESULT_ITEM='R1' and the INPUT_ITEM='R10'. That is why the query of Step 2 involves the second SELECT from table FORMULAS. Note that the WHERE clause corresponding to this SELECT adds formula conditions as input items only if they are defined.

The query of step 3 then selects those result items from table DEPENDS whose formulas can be computed during the first pass. These are the result items whose input items are not themselves result items of any formulas—i.e., whose input items would have the values from the start.

The structure of this query corresponds to the standard way of implementing negation in SQL: To find out who does not do X, first find out those who do X, and then remove them from the list of those who potentially can do X.

Here, the inner query first selects those result items that do have input items which are themselves result items of formulas. The outer query then selects those result items that are not among those retrieved by the inner query. These result items are then inserted into table PASSES with PASS value of 1 (the current value of variable @P). The intent of table PASSES is to record which result items can be computed during which pass of the overall computation.

The particular form of the query of Step 3 was chosen for simplicity of presentation. In an actual system, this query may be equivalently rewritten using the NOT EXISTS construct for better efficiency, for example as shown in FIG. 20.

Step 4 is a WHILE loop that uses TRANSACT SQL system variable @@rowcount. (By syntax, all system variables in TRANSACT SQL begin with @@.) This variable always contains the number of rows affected by the last executed SQL statement. Condition (@@rowcount>0) then checks whether any rows were inserted into table PASSES by the query of Step 3; if there were, then the computation enters the WHILE loop.

The body of the WHILE consists of three SQL queries. The inner query of Step 5 identifies those result items that appear in table PASSES with the current value of variable @P—i.e., those result items that were inserted into PASSES by the last executed INSERT INTO PASSES. The outer DELETE of Step 5 then deletes rows with those result items from table DEPENDS. (As they have already been "sequenced for evaluation," they can be removed from further consideration.) Again, the particular form of the query of Step 5 was chosen for simplicity of presentation.

Step 6 in the body of the WHILE loop increments variable @P by 1, which then becomes 2.

Step 7 in the body of the WHILE loop then repeats Step 3, in effect identifying and recording in table PASSES the result items that can be computed in the next pass—i.e., pass 2.

The WHILE loop thus continues to iterate, identifying and recording in table PASSES the sets of result items to be computed in sequentially numbered passes 1, 2, 3, etc., until the "top-most" result items have been added to table PASSES in Step 7. On the next iteration of the loop, these top-most result items are deleted from table DEPENDS, which then becomes empty. The next execution of Step 7 fails to insert any rows into table PASSES and the system variable @@rowcount becomes 0. This, in turn, terminates the loop.

Step 8 then updates column COMPUTE_PASS in table FORMULAS with the values of PASS from table PASSES.

The program of FIG. 19 assumes that there are no circular dependencies in table DEPENDS. While this assumption is reasonable—there should not be any circular definitions among the formulas, it is also straightforward to manually check formulas for circular definitions or to develop an SQL solution to check for such circularities.

7. Putting It All Together

An illustrative SQL program implementing the analytic engine of the present invention which computes all of the types of formulas presented above (including all of the described enhancements) and which follows the prescribed order of formula evaluation is presented in FIG. 21 (the successive combination of FIGS. 21A-21C). This program assumes that tables PERIODS, DATA, and FORMULAS are defined as described in FIGS. 8, 9 and 17, respectively.

The program begins in Step 1, by declaring variables @P and @NUM_PASSES, assigning 1 to @P, and assigning the largest value of column COMPUTE_PASS from table FORMULAS to @NUM_PASSES.

In Step 2, the programs checks that the value of @P is less-than-or-equal to @NUM_PASSES—i.e., there are formulas still to be computed in pass @P, and if yes then enters the WHILE loop.

The body of the WHILE loop comprises two SQL statements: the statement of Step 3 and the statement of Step 7.

The statement of Step 3 is the main computational statement of the analytic engine. Its body consists of three components. The component of Step 4 computes computational formulas, the component of Step 5 computes comparative formulas and the component of Step 6 computes logical formulas. These components are taken from FIGS. 16, 13 and 14, respectively, except for the additional conditions COMPUTE_PASS=@P in their respective WHERE clauses, limiting the computation to the formulas that should be computed in the present pass.

The results of components of Steps 4, 5 and 6 are then unioned together. This combined result represents the answers to all formulas that were to be computed in the present pass for all period/entity combinations. This combined result is then inserted into table DATA by the INSERT command of Step 3.

The statement of Step 7 then increments variable @P by 1. The WHILE loop continues to iterate until all formulas in all passes have been computed.

Note that the number of the iterations of the WHILE loop—i.e., the number of passes, is equal to the largest value of column COMPUTE_PASS in table FORMULAS. This, in turn, corresponds to the length of the longest formula dependency chain. If one visualizes the set of formulas as a formula graph, then this length of the longest dependency chain corresponds to the depth of the graph, which is usually the logarithm of the number of distinct metrics and analytic formulas.

This fact that the number of SQL query executions made by the analytic engine is proportional only to the logarithm of this number of distinct metrics and analytic formulas, and is completely independent of the number of business entities or the number of periods involved, makes the analytic engine of the present invention quite efficient.

One or more aspects of the invention may be embodied in computer-executable instructions, such as in one or more program modules, executed by one or more computers or other devices. Generally, program modules include routines, programs, objects, components, data structures, etc. that perform particular tasks or implement particular algorithms when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method of computing an algebraic formula, comprising:
   storing, using a processor, the formula as data in a set of table rows in a table in a database, wherein the table is arranged as a plurality of fixed table rows and a plurality of fixed table columns, and further wherein each table row identifies only a single result item of the formula, only a single input item in the formula, and only a single relationship of the input item to the result item; and
   using the formula to compute a financial analytic;
   wherein the result item, the input item, and the relationship of the input item to the result item, are each stored in a separate table column for each table row, and further wherein a plurality of rows identify the same single result item.

2. The method of claim 1, wherein the formula is represented only as data in said database.

3. The method of claim 1, wherein the formula is a computational formula.

4. The method of claim 3, wherein an input item in said computational formula refers to a result item defined by another computational formula.

5. The method of claim 3, wherein an input item in said computational formula comprises a literal constant.

6. The method of claim 3, further comprising specifying, for each input item in said computational formula, whether the each input item is mandatory or optional.

7. The method of claim 3, further comprising requiring that at least a minimum number of input items have values in said computational formula.

8. The method of claim 3, wherein said computational formula requires that the result of a conditional formula be True.

9. The method of claim 3, further comprising:
   specifying a plurality of alternative computational formulas as definitions for a result item; and
   establishing a priority order among the alternative computational formulas.

10. The method of claim 1, wherein the formula is a conditional formula.

11. The method of claim 10, wherein an input item in said conditional formula refers to a result item defined by a computational formula.

12. The method of claim 10, wherein an input item in said conditional formula refers to a result item defined by another conditional formula.

13. The method of claim 10, wherein an input item in said conditional formula comprises a literal constant.

14. The method of claim 1, further comprising:
   storing a second formula as data in the database;
   establishing dependencies among said formulas; and
   calculating a computational pass number for each formula.

15. A computer readable medium storing computer executable instructions that cause a processor to execute a method of computing an algebraic formula, said method comprising:
   storing the formula as data in a set of table rows in a table in a database, wherein the table is arranged as a plurality of fixed table rows and a plurality of fixed table columns, and further wherein each table row identifies: (i) only a single result item of the formula, (ii) only a single input item in the formula, (iii) a formula condition of the formula, (iv) a minimum number of required items of the formula, (v) an input role, (vi) a mandatory item flag of the formula, and (vii) only a single relationship of the input item to the result item; and
   wherein (i) the result item, (ii) the input item, (iii) the formula condition, (iv) the minimum number of required items, (v) the input role, (vi) the mandatory item flag, and (vii) the relationship of the input item to the result item, are each stored in a separate table column for each table row, and further wherein a plurality of rows identify the same single result item.

16. The computer readable medium of claim 15, wherein the formula is represented only as data in said database.

17. The computer readable medium of claim 15, wherein the formula is a computational formula.

18. The computer readable medium of claim 17, wherein an input item in said computational formula refers to a result item defined by another computational formula.

19. The computer readable medium of claim 17, wherein an input item in said computational formula comprises a literal constant.

20. The computer readable medium of claim 17, wherein said executed method further comprises specifying, for each input item in said computational formula, whether the each input item is mandatory or optional.

21. The computer readable medium of claim 17, wherein said executed method further comprises requiring that at least a minimum number of input items have values in said computational formula.

22. The computer readable medium of claim 17, wherein said computational formula requires that the result of a conditional formula be True.

23. The computer readable medium of claim 17, wherein said executed method further comprises:
specifying a plurality of alternative computational formulas as definitions for a result item; and
establishing a priority order among the alternative computational formulas.

24. The computer readable medium of claim 15, wherein the formula is a conditional formula.

25. The computer readable medium of claim 24, wherein an input item in said conditional formula refers to a result item defined by a computational formula.

26. The computer readable medium of claim 24, wherein an input item in said conditional formula refers to a result item defined by another conditional formula.

27. The computer readable medium of claim 24, wherein an input item in said conditional formula comprises a literal constant.

28. The computer readable medium of claim 15, wherein said executed method further comprises using the formula to compute a financial analytic.

29. The computer readable medium of claim 15, wherein said executed method further comprises:
storing a second formula as data in the relational database;
establishing dependencies among said formulas; and
calculating a computational pass number for each formula.

30. The computer readable medium of claim 15, wherein said executed method further comprises storing a second formula as data in the relational database; and wherein the executable instructions compute all formulas with a specific computational pass number for all periods for all business entities in a single loop-free SQL statement without use of explicit cursors.

31. The computer readable medium of claim 15, wherein said executed method further comprises storing a second formula as data in the relational database; and wherein a total number of executions of SQL statements computing the formulas is equal to a number of computational passes.

32. The computer readable medium of claim 15, wherein said executed method further comprises storing a second formula as data in the relational database; and a total number of executions of SQL statements computing computational passes is proportional to the number of said passes.

33. The computer readable medium of claim 15, wherein the executable instructions do not contain information about any formulas in source code.

34. A computer readable medium comprising computer executable instructions which, when executed by one or more processors, perform a method for computing algebraic formulas, said method comprising steps of:
storing a plurality of formulas, each as one or more table rows in a table in a database, wherein the table is arranged as a plurality of fixed table rows and a plurality of fixed table columns, and further wherein each table row represents an edge of a directed acyclic graph, wherein nodes of the graph represent variables, constants, or operators, and edges of the graph represent relationships among the variables, constants, and operators;
determining, for each input item of each computational formula of the plurality of formulas, whether the each input item is mandatory or optional;
specifying a minimum number of input items required to have values in said each computational formula, wherein the computational formula is only executed when at least the minimum number of input items have values;
specifying a plurality of alternative computational formulas as definitions for a result item;
establishing a priority order among the alternative computational formulas for the result item;
partitioning the plurality of formulas according to dependencies among the plurality of formulas such that all formulas in a given partition can be computed simultaneously;
assigning each formula in the same partition a same computational pass number; and
simultaneously computing a plurality of formulas in at least one of the partitions.

35. The computer readable medium of claim 34, wherein at least one computational formula requires that the result of a conditional formula be True.

36. The computer readable medium of claim 34, wherein the executable instructions compute all formulas with a specific computational pass number for all periods for all business entities in a single loop-free SQL statement without use of explicit cursors.

37. The computer readable medium of claim 34, wherein a total number of executions of SQL statements computing the formulas is equal to the number of computational passes.

38. The computer readable medium of claim 34, wherein a total number of executions of SQL statements computing the computational passes is proportional to the number of said passes.

39. The computer readable medium of claim 34, wherein the executable instructions do not contain information about any formulas in source code, and wherein formula information is stored only as data in the relational database.

* * * * *